United States Patent
Römer et al.

(10) Patent No.: US 6,845,988 B2
(45) Date of Patent: Jan. 25, 2005

(54) METHOD OF CONTROLLING THE QUANTITY OF AIR IN A VEHICLE LEVEL CONTROL SYSTEM

(75) Inventors: Matthias Römer, Altdorf (DE); Hans Scheerer, Esslingen (DE); Frank Schweickhardt, Stuttgart (DE); Thomas Sprengel, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 245 days.

(21) Appl. No.: 10/316,974

(22) Filed: Dec. 11, 2002

(65) Prior Publication Data

US 2003/0107191 A1 Jun. 12, 2003

(30) Foreign Application Priority Data

Dec. 11, 2001 (DE) .......................................... 101 60 972

(51) Int. Cl.$^7$ ............................................... B60G 17/00
(52) U.S. Cl. ............................... 280/5.514; 280/6.157; 280/124.16; 701/37
(58) Field of Search .......................... 280/5.514, 6.157, 280/6.158, 6.159, 124.159, 124.16; 267/64.16, 64.28; 701/37

(56) References Cited

U.S. PATENT DOCUMENTS

| | | | | |
|---|---|---|---|---|
| 4,858,895 A | * | 8/1989 | Buma et al. | 267/64.16 |
| 5,652,703 A | * | 7/1997 | Kawazoe | 701/37 |
| 6,173,974 B1 | * | 1/2001 | Raad et al. | 280/6.157 |
| 6,282,470 B1 | * | 8/2001 | Shono et al. | 701/37 |
| 6,418,363 B2 | * | 7/2002 | Cochofel et al. | 701/37 |
| 6,471,196 B2 | * | 10/2002 | Stiller | 267/64.16 |
| 6,685,174 B2 | * | 2/2004 | Behmenburg et al. | 267/64.28 |

FOREIGN PATENT DOCUMENTS

DE 100 55 108 5/2000

* cited by examiner

Primary Examiner—David R. Dunn
(74) Attorney, Agent, or Firm—Klaus J. Bach

(57) ABSTRACT

In a process for controlling the quantity of air in a closed, chargeable and estimable pneumatic level control system of a vehicle, which level control system comprises at least one pressure sensor, one pump, an actuator, a storage reservoir and pressure lines interconnecting these components, at least one vehicle body level sensor, and a temperature sensor, which measures the ambient temperature, from the values measured an air mass of the level control system is calculated on the basis of the air pressures in the components, the level of the vehicle and the ambient temperature. Furthermore, the level of the vehicle, the ambient temperature and a maximum possible change in level from a particular vehicle level are used to calculate a vehicle-specific desired air mass and a desired air pressure in the system. The air mass is increased if the actual air pressure drops below the desired air pressure, and the air mass is reduced if the actual air pressure exceeds the desired air pressure.

8 Claims, 1 Drawing Sheet

METHOD OF CONTROLLING THE QUANTITY OF AIR IN A VEHICLE LEVEL CONTROL SYSTEM

BACKGROUND OF THE INVENTION

The invention relates to a method of controlling the quantity of air in a closed, chargeable and emptiable pneumatic level control system in a vehicle, which level control system comprises at least one pressure sensor, one pump, at least one actuator, at least one storage reservoir and circuitry connecting these assemblies, and at least one level sensor, the pressure sensor measuring the air pressure in the individual components of the level control system.

In a pneumatic level control system the actuators are generally pneumatic springs arranged on at least one vehicle axle between the individual wheel and the vehicle body. To raise the level of the vehicle body, the individual pneumatic spring is connected to a pressure source, for example a pump, which takes in air from the surroundings, or to a pressurized gas storage reservoir. To lower the level of the vehicle body, the individual pneumatic spring is connected to a pressure sink, for example the surroundings. The performance of the pump determines hereby the speed with which the level is increased. The energy expended in the process is lost when the vehicle body is lowered by discharging the air into the surroundings.

DE 100 55 108, which was published after the priority date, discloses a pneumatic suspension device having a closed compressed air system.

In this system a pressurized gas storage reservoir is connected to the pneumatic springs in order to raise the level of the vehicle body. When the vehicle body is lowered, air is returned from the pneumatic springs into the storage reservoir with or without pump assistance. An air exchange with the ambient air only takes place if the pressure differences between the individual components of the compressed air system are not sufficient for the desired change in level.

It is the object of the present invention to provide a method of controlling the quantity of air in a closed level control system, which allows the level to be controlled within the closed system in every state of the system.

SUMMARY OF THE INVENTION

In a process for controlling the quantity of air in a closed, chargeable and emptiable pneumatic level control system of a vehicle, which level control system comprises at least one pressure sensor, one pump, an actuator, a storage reservoir and pressure lines interconnecting these components, at least one vehicle body level sensor, and a temperature sensor, which measures the ambient temperature, from the values measured an air mass of the level control system is calculated on the basis of the air pressures in the components, the level of the vehicle and the ambient temperature. Furthermore, the level of the vehicle, the ambient temperature and a maximum possible change in level from a particular vehicle level are used to calculate a vehicle-specific desired air mass and a desired air pressure in the system. The air mass is increased if the actual air pressure drops below the desired air pressure, and the air mass is reduced if the actual air pressure exceeds the desired air pressure.

The quantity of air in the system is maintained to a large extend while the level is controlled.

The air mass in the level control system is adjusted as a function of the parameters ambient temperature, actual level of the vehicle body and the air pressures in the individual components in such a way that, from the actual level of the vehicle body, a maximum change in level is possible without an exchange of air with the surroundings.

For this purpose, the air mass in the level control system is calculated as a function of the determined parameters during a period of time in which no level adjustment is performed. If, for example, the vehicle body is at its lowest level, then the maximum level change is to raise the vehicle body to the upper end position. Conversely, with the vehicle body in the upper end position, the maximum level change is a lowering of the vehicle body to the lower end position. The air mass is also calculated for the upper or lower end position after a level change as a function of the ambient temperature. The geometry data of the vehicle components involved in the level adjustment and the gas constants are the same for all the calculations. An air mass needed to raise the vehicle body, or a maximum permitted air mass release needed to lower the vehicle, can be determined from these calculations. With an air mass of this order of magnitude, there is always a pressure difference between the storage reservoir and the individual components during a level change process, which can be managed by the pump.

If the actual air mass is lower than the desired air mass, then the air mass in the system is increased with the aid of the pump, which takes in ambient air. If, in contrast, the desired air mass is lower than the actual air mass, then the air mass is reduced for example by means of a discharge valve, which discharges air the surroundings.

The exchange of air with the environment therefore normally takes place outside the level adjustment control time.

During a level change, no exchange of air with the environment takes place; a level adjustment takes place within the closed system.

An additional air supply into the system is however possible in the event of an emergency, wherein air is pumped directly into the pneumatic springs by the pump. In the event of an emergency it is also possible to quickly lower the vehicle body by emptying the level control system to the surroundings.

The invention will be described in detail below on the basis of an embodiment shown in a schematic illustration.

DESCRIPTION OF A PREFERRED EMBODIMENT

Figure 1:
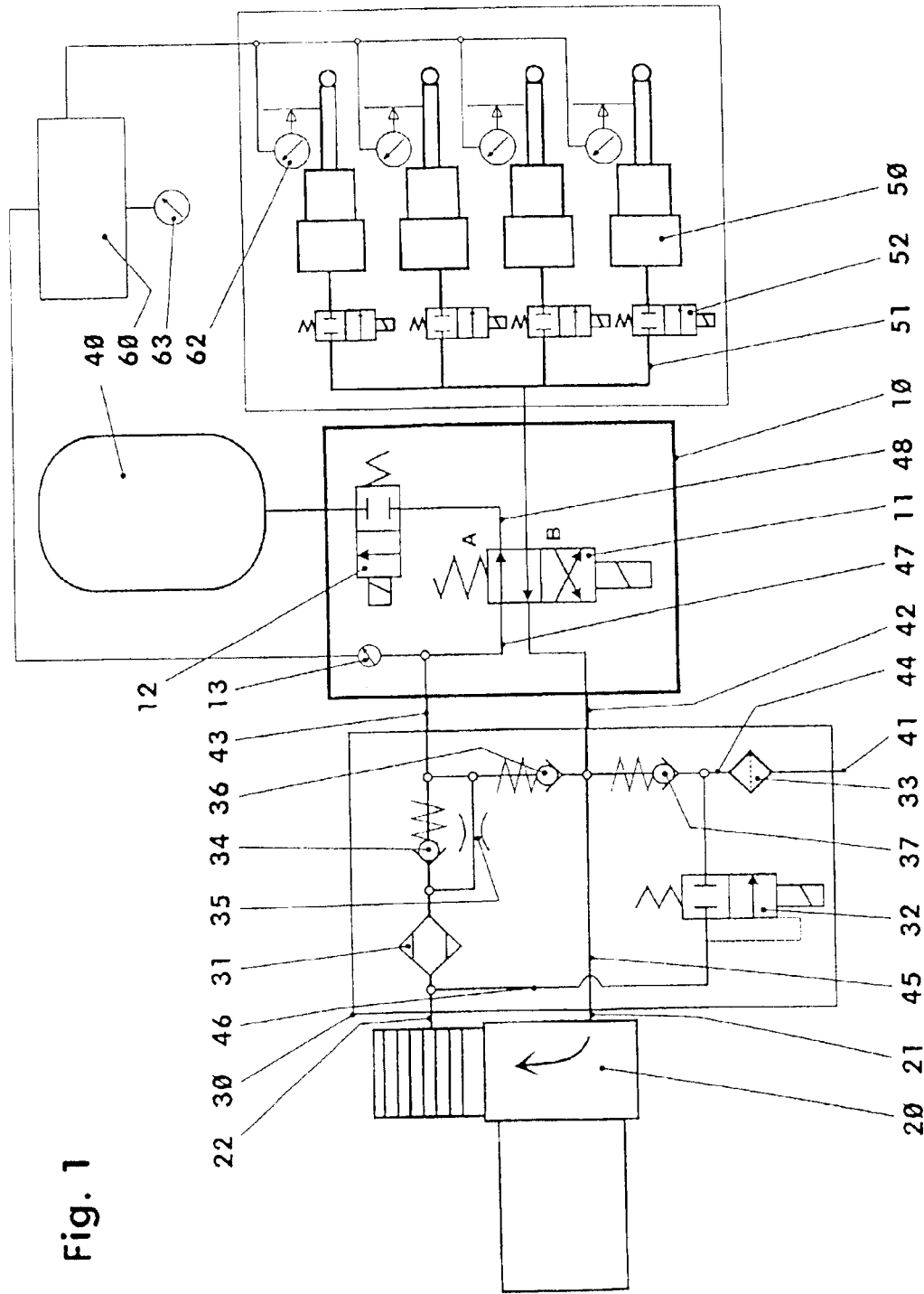
FIG. 1 shows a circuit for a closed, chargeable and emptiable vehicle level control system.

FIG. 1 shows the circuit of a closed, chargeable and emptiable level control system. The level control system is for example part of a pneumatic vehicle suspension. The pneumatic suspension comprises one pump (20), one storage reservoir (40) and, for example, four almost entirely loss-free pneumatic springs (50), which are installed as a rule between the chassis and the vehicle wheels on vehicles having a pneumatic suspension. These assembly groups are connected to each other by means of a pressure control circuit (30) and a pressurized gas distribution circuit (10). The pressure control circuit (30) may also be integrated in the pump (20).

The pressure control circuit (30) has five outer connections (21, 22, 41, 42, 43). Here, connection (21) forms the suction connection of the pump (20).

The pump (20) supplies air to the pressure control circuit (30) through the pressure connection (22) of the pump (20).

The connection (41) forms the air intake connection and air discharge connection of the system. The pressure control circuit (30) is in communication with the environment by way of this connection (41), fresh ambient air being sucked in with the aid of the pump (20) and air from the level control system being discharged into the environment.

The pressure control circuit (30) is connected to a distribution circuit (10) of the system by means of the connections (42) and (43). The connection (42) forms a return air connection and the connection (43) forms a compressed air supply connection.

The pressure control circuit (30) is used in combination with the pump (20) to perform on one hand the intake, discharge, filtering and drying of the compressed air and to increase the pressure of the air in the level control system on the other. In order to generate compressed air, the pump (20) sucks in ambient air through its intake (21) on the suction side through the fresh air connection (41), a filter (33), a suction line (44) and a non-return valve (37). On the other hand, compressed return air or used air from the storage reservoir (40) or the pneumatic springs (50) is present at the return air connection (42) in the suction line (45) leading to the pump (20). In order to prevent the return air, which is present at the return air connection (42) from escaping into the environment, the non-return valve (37) blocks in the direction of the filter (33) and in the direction of the fresh air connection (41).

The air compressed by the pump (20) is conducted through the outlet (22) at the pressure side to the pressure control circuit (30). There, the air is made available at a compressed air connection (43) via a dryer (31) and a spring-loaded non-return valve (34). The non-return valve (34) blocks in the direction of the dryer (31). A throttle valve or shutter valve (35) is located parallel to the non-return valve (34) and between the dryer (31) and the compressed air connection (43).

The compressed air connection (43) is also connected via a non-return valve (36) to the suction line (45). The spring-loaded non-return valve (36) blocks in the direction of the suction line (45). This arrangement makes it possible to carry out control processes without feeding in energy or running the pump if there is a pressure differential. As a result, additional pump assistance (e.g. quick-release) is also possible.

An air discharge line (46) is connected between the outlet (22) on the pressure side of the pump (20) and the dryer (31), which air discharge line (46) is routed through a discharge valve (32) and joins the suction line (44) between the filter (33) and the non-return valve (37). The discharge valve (32) is a 2/2-port directional control valve, being held in the blocking position or the rest position by a mechanical return spring. Upon actuation, the valve element of the valve 32 is moved electromagnetically and/or under pressure control—in a pressure relief valve function—into the through-flow position.

The pressure distribution circuit (10) interconnects the pneumatic springs (50), the storage reservoir (40) and the pressure change circuit (30). A central component of the distribution circuit (10) is a return-spring-loaded 4/2-port directional control valve (11), having two through-flow positions and being electromagnetically actuated. This valve is also called the master valve (11).

In a rest position A of the master valve (11), on the one hand the distribution line (51) coming from the pneumatic springs (50) is directly connected to the suction-side connection (21) of the pump (20) via the suction line (45). On the other hand, the compressed air connection (43), which is supplied inter alia from the pressure side of the pump (20), is connected to the pressure reservoir (40) via the storage lines (47) and (48).

In the actuation position B of the master valve (11), the storage reservoir (40) is connected to the suction side of the pump (30), the pneumatic springs (50) being connected to the pressure side of the pump (20).

A storage charge valve (12) is located in the storage line (48) between the master valve (11) and the storage reservoir (40), the storage charge valve (12) being an electromagnetically actuated 2/2-port directional control valve having a blocking rest position and a mechanical return spring mechanism.

A pressure sensor (13) is arranged in the storage line (47) extending between the pressure connection (43) and the master valve (11).

FIG. 1 shows one 2/2-port directional control valve (52) which has a locking rest position and is arranged upstream of each pneumatic spring (50) in each connecting line (51). The valves (52) are return-spring-biased and are electromagnetically actuated. The directional control valves (52) can be arranged directly on the pneumatic springs (50). Alternatively, they can also be arranged individually or together in a valve block in the connecting line (51). Of course, the directional control valves (52) can also be integrated in the distribution circuit (10).

The operation of the pneumatic suspension with the level control system can be described with five different switching states. In a first switching state the pump (20) is switched on. The valve (11) is in position B, and at least one of the 2/2-port directional control valves (52) is in the through-flow position. In this switching state the pneumatic springs (50) are charged with ambient air or from the storage reservoir (40) if the storage charge valve (12) is switched to the through-flow position.

In a second switching state the corresponding 2/2-port directional control valve (52) is switched to the through-flow position in order to relieve the load on, or empty, the pneumatic springs (50), and the master valve (11) is held in the position A. The storage charge valve (12) is switched to the through-flow position. Air is then conducted from the pneumatic springs (50) through the non-return valve (36) or the pump (20) to the storage reservoir (40).

In a third switching state the master valve (11) is switched to position A and the storage charge valve (12) is switched to the through-flow position in order to charge the storage reservoir (40) with ambient air. The pump (20) now sucks in air from the environment through the filter (33) and the non-return valve (37) and pumps this air into the storage reservoir (40).

In a fourth switching state the storage charge valve (12) and the discharge valve (32) are switched to the through-flow position and the master valve (11) is switched to position A in order to empty or relieve the load on the storage reservoir (40). The air then flows through the throttle (35) to the intake and air discharge connection (41).

In a fifth switching state the 2/2-port directional control valve (52) and the discharge valve (32) are switched to the through-flow position and the master valve (11) is switched to position B in order to empty or relieve the load on the pneumatic springs (50). The air then flows through the throttle valve (35) to the air discharge connection (41).

When the vehicle is operating, the five switching states are called up either individually or in combination.

To raise the vehicle with the aid of the pneumatic springs (50), initially the storage charge valve (12) and the main valve (11) and the 2/2 way valve (52) are temporarily moved one after another into the operating position or opened. In the process, the storage pressure and the pneumatic spring pressure are recorded at different times from each other by the central pressure sensor (13). While the valve element of the master valve (11) is in the operating position B and the valves (52) are open, the storage charge valve (12) is opened. Depending on the pressure difference between the storage reservoir (40) and the pneumatic springs (50), the air flows either through the return air connection (42) and the non-return valve (36) to the spring (50), or, under a pressure increase, via the pump (20) to the compressed air connection (43) and to the pneumatic springs (50). When the desired level is reached, all the valves (12, 52) are closed and if appropriate the pump (20) is switched off.

If the vehicle is to be lowered, the valve element of the master valve (11) is moved to the inoperative position A after the pressure measurement process for the storage reservoir (40) and the pneumatic springs (50). If the pressure in the storage reservoir (40) is greater than the pressure in the pneumatic springs (50), then the pump (20) conveys—the valve (12) being open—the air which has been sucked out from the pneumatic springs (50) through the dryer (31), the non-return valve (34) and the storage charge valve (12) into the storage reservoir (40). If the central pressure sensor (13) determines that the system pressure is disadvantageously high, then air may be discharged from the storage reservoir (40) or from the pneumatic springs (50) through the throttle valve (35), the dryer (31) and the discharge valve (32).

If the pressure in the storage reservoir (40) is lower than the pressure in the pneumatic springs (50), compressed air flows through the master valve (11) and the storage lines (47, 48) into the storage reservoir (40), the flow being pump-assisted if appropriate.

When the vehicle engine starts the temperature sensors for the intake air (63) and the engine oil temperature, for example, are compared with each other. Here, the temperature of the intake air corresponds to the ambient temperature surrounding the vehicle. If the temperatures obtained by both sensors are approximately identical, then it is a cold start.

During the starting procedure, the level of the vehicle is adjusted according to the driver's wishes or, for example, by program control.

After the vehicle drives away, the ambient temperature surrounding the vehicle continues to be monitored. If the ambient temperature drops severely after, for example, five minutes, for example if the vehicle has exited an underground parking lot with temperatures of around +10° C., the volume of the air enclosed in the pneumatic springs (50) decreases. For example, the volume of a gas cooled from 0° C. to −40° C. decreases by around 15%. The vehicle body is lowered. The level control system responds and raises the vehicle body back to the pre-selected value. During the lowering of the vehicle body and during the level correction process the density of the air in the storage reservoir (40) decreases. The volume is made available to an air mass, which has shrunk.

The pressure is now measured at the central pressure sensor (13) in turn in each of the individual components of the level control system.

The mass of the air in the level control system is calculated using the values for the ambient temperature, the vehicle body level, the gas constants and the individual air pressures.

I is possible for example that, at the start of driving, the vehicle body was lowered all the way down in order to drive more safely on a cleared but in places slippery road surface. After some time the vehicle is, for example, driven onto an uncleared track covered by deep snow. It would then be necessary to raise the level of the vehicle body.

The maximum possible change in level is calculated from the current level of the vehicle body. The air mass required for the change in level from the lowest to the highest level is calculated from the desired new vehicle body level, the ambient temperature and the required air pressure for the level change. The required pressure in the storage reservoir (40), which needs to be maintained for this change in level, is obtained from this value, for example by means of the ambient temperature and the gas constants.

If the actual air pressure as determined by the pressure sensor (13) is lower than this required pressure, the level control system can only perform this control action by sucking in ambient air, and only with a low regulating speed. The system pressure is therefore increased. To do this the pump (20) pumps ambient air into the storage reservoir (40). This process takes place during a period, in which no level adjustment is taking place. The air pressure and the air mass in the pneumatic springs (50) remains unchanged during that time. When the air pressure in the storage reservoir (40) has reached the required pressure, the storage charge valve (12) is closed again and the pump (20) is switched off.

When the vehicle is operating for example in a desert, high temperature fluctuations between daytime temperatures and night-time temperatures occur. During the night the ambient temperatures are, for example, +10° C. In the daytime, due to the high ambient temperatures and, in some cases, also due to the heat coming from the engine, the temperature in the area of the pneumatic springs can climb to +100° C. In the process, the volume of the air in the pneumatic springs (50) increases for example by around 32%. The vehicle body is raised thereby.

The level change of the vehicle body is accommodated by means of the level control system. The air mass in the storage reservoir (40) is increased as a result, and the pressure in the storage reservoir (40) increases.

If this vehicle is driven for example off-road, the level of the vehicle body is to be raised. In this case the air mass in the level control system is also calculated from the air pressures in the individual components, from the level of the vehicle body and from the ambient temperature. The maximum possible level change then resides in lowering the vehicle body to the lower end position. The required air mass is also calculated for this end position. This results in a maximum permissible pressure of the air in the system, at which pressure this level change can still be performed without external equalization of the air mass. If the calculated air pressure in the system is higher than this pressure, this level change cannot be performed with the closed system, even with pump assistance. Now, for example with regular monitoring of the air pressures, air is discharged from the storage reservoir (40) into the surroundings, resulting in a lowering of the air pressure and the air mass in the level control system. The air pressure and the air mass in the pneumatic springs (50) remain constant in the process. This process is stopped when the actual air pressure in the storage reservoir (40) corresponds to the desired air pressure.

If for example the vehicle has ground contact during off-road operation, it may be necessary to raise the vehicle body in order to come free. If the air mass in the storage reservoir (40) is for example not yet sufficient, the air mass in the system can be adapted in the pneumatic springs (50). The pump (20) then sucks in ambient air through the non-return valve (37) and supplies this air to the pneumatic springs (50). The air mass in the level control system is thus increased without interruption to the level control process.

If, for example, a fast lowering of the vehicle body, e.g. a quick-release function, is to be expected, the level control system can be prepared for this before the actual level lowering process. For this purpose, the air mass in the level control system is reduced with the vehicle body raised. After the reduction of the air pressure in the storage reservoir (40), as the vehicle body is lowered the air flows from the pneumatic springs (50) into the storage reservoir (40) through the master valve (11), the latter being in the position A, the non-return valve (36) and the storage charge valve (12), if necessary with the assistance of the pump (20). During the fast lowering there is no time-consuming discharging of the air through the throttle valve (35) and the discharge valve (32).

If the vehicle body is for example in a mid-level position, the air pressure in the level control system is increased far enough until the vehicle body level can be raised further. If, however, the vehicle body is to be lowered from this position, the air flowing back from the pneumatic springs (50) is conducted to the storage reservoir (40) with the aid of the pump (20). After completion of the level adaptation the air mass in the level control system is then adjusted.

The exchange of air with the environment therefore takes place outside the level adjustment time. The number of these energetically disadvantageous exchange processes is restricted to a minimum.

The required and the permitted air masses and air pressures can have a wide tolerance range. In this way, excessive operation of the level control is avoided.

At the same time, the influence of the spring action at one wheel during the determination of the operational parameters is reduced by means of monitoring the air mass.

The accuracy of the control is thus increased. Additionally, it is possible to define vehicle-specific threshold pressures at which the level control system is opened to the outside for charging or emptying.

The adaptation of the air mass is performed for example after every cold start of the vehicle. It can, however, also be performed in some cases after fixed time intervals, after every loading and/or unloading, after each level adjustment, when there are fluctuations in temperature, at the driver's request etc. The determination of the individual air pressures normally takes place in the time periods in which no level adjustment is being performed. The pressure adjustment can therefore be slow requiring only a relatively small pump and air flow through the filter and dryer is relatively slow for high efficiency. If nonetheless the vehicle body level is to be changed while the air pressure is being determined, the air mass adaptation process is interrupted. After the change in the vehicle body level has been performed, the quantity of air adaptation is then performed again or, in some cases, continued.

During the determination of the quantity of air it is also possible, for example, for a leak in the level control system to be detected. In the event of a leak, for example, the air mass in the level control system is lower than the air mass set after the previous adaptation process. The location of the leak can be narrowed down by comparing the air pressures in the individual components. If a leak is then detected, the level control system is, for example, switched off and an error message is provided.

Additional dynamic driving parameters can also be evaluated in order to determine the necessary or required air mass. For example monitoring of the vehicle speed can ensure that the air mass in the level control system does not exceed a threshold value. For example, unintentional and dangerous raising of the vehicle body level at high driving speeds may then be prevented.

The air mass adapts itself to the ambient influences, such as the pressure or the temperature, which change over the long term. The behavior of the system is therefore independent of the particular geographical and climatic conditions at the point of application.

Furthermore, by registering the habitual driver characteristics it is possible to perform an adaptation of the desired pressure to the habits or wishes of the individual driver. This can be implemented either by means of suitable algorithms or by means of a selecting device.

It is noted that any suitable gas can be used for the present purposes instead of compressed air.

What is claimed is:

1. A method of controlling the quantity of air in a closed, chargeable and emptiable pneumatic level control system of a vehicle, which level control system comprises at least one pressure sensor, one pump, at least one actuator, at least one storage reservoir and circuitry interconnecting these components, at least one level sensor, and a pressure sensor measuring the air pressure in the individual components of the level control system, said method comprising the steps of:

providing a temperature sensor (63) which measures the ambient temperature around the vehicle, calculating the air mass of the level control system from the air pressures in the individual components (40, 50), the actual level of the vehicle and the ambient temperature, calculating a vehicle-specific desired air mass and a desired air pressure from the desired level of the vehicle, the ambient temperature and the maximum possible change in level from the actual vehicle level, increasing the air mass in the level control system if the actual air pressure is below the desired air pressure, and reducing the air mass in the level control system if the actual air pressure exceeds the desired air pressure.

2. A process according to claim 1, wherein the temperature determination and the quantity of air control take place in the level control system after vehicle operation has been started.

3. A process according to claim 1, wherein in the event of a low level emergency, the pump (20) pumps ambient air directly into the actuators (50) while the level adjustment is being performed.

4. A process according to claim 1, wherein, in the event of a high level emergency, the level control system discharges air from the actuators (50) into the environment.

5. A process according to claim 1, wherein the level control system diagnoses a leak in the event of differences between two successive air mass determinations.

6. A process according to claim 1, wherein dynamic driving parameters are additionally evaluated for the determination of the required or permissible air mass.

7. A process according to claim 1, wherein driver-specific parameters are additionally evaluated for the determination of the required or permissible air mass.

8. A process according to claim 1, wherein, for determining the system pressure, only one central pressure sensor is used for the whole level control system.

* * * * *